May 3, 1927. 1,626,874
J. PRIMROSE
OIL HEATER AND METHOD OF OPERATING SAME
Filed May 11, 1925 2 Sheets-Sheet 2

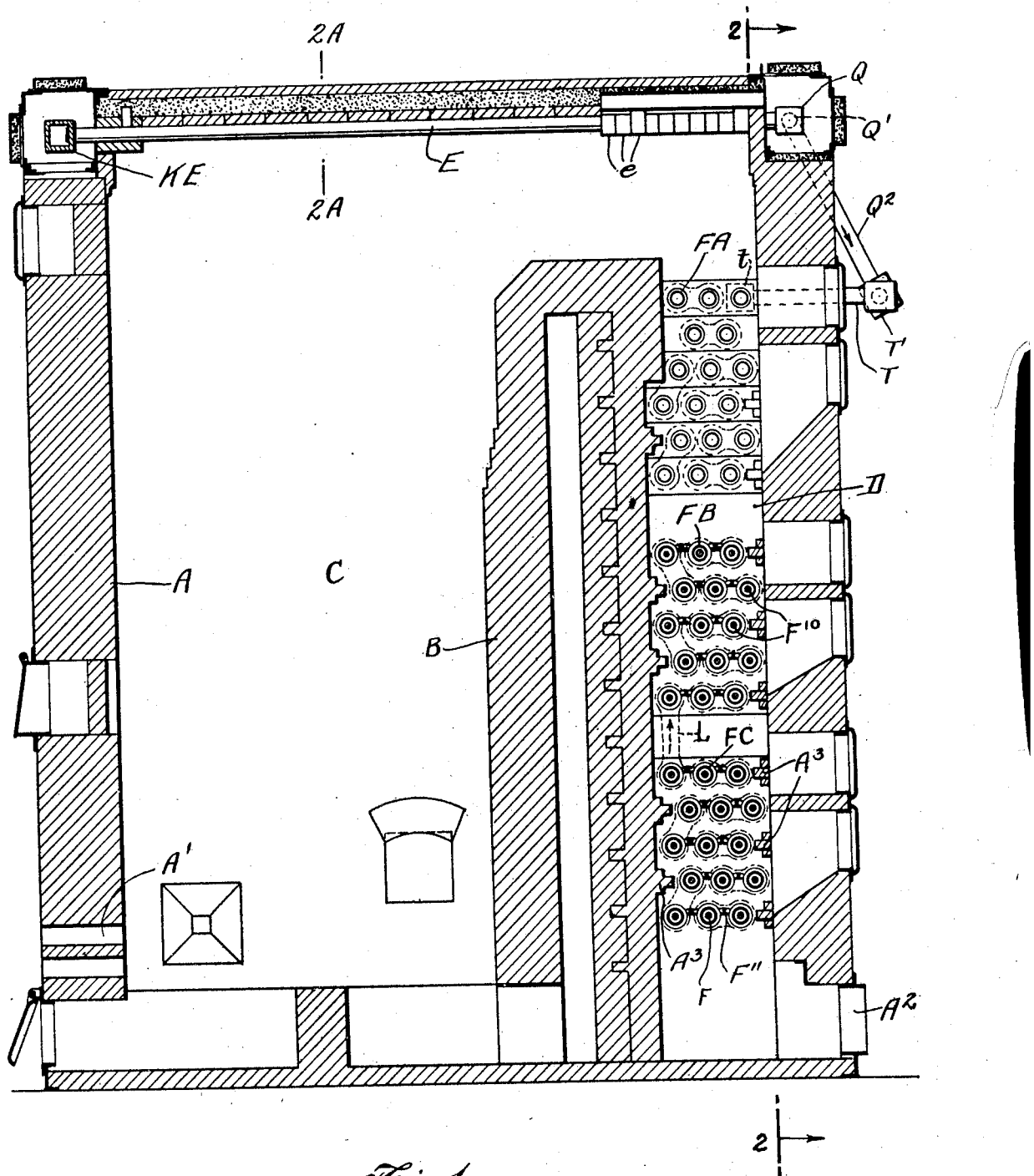

INVENTOR
John Primrose
BY
John E. Hubbell
ATTORNEY

Patented May 3, 1927.

1,626,874

UNITED STATES PATENT OFFICE.

JOHN PRIMROSE, OF NEW YORK, N. Y., ASSIGNOR TO POWER SPECIALTY COMPANY, OF NEW YORK, N. Y., A CORPORATION OF NEW YORK.

OIL HEATER AND METHOD OF OPERATING SAME.

Application filed May 11, 1925. Serial No. 29,411.

The present invention relates to tubular oil heaters especially devised for use in refining petroleum, and is characterized by the proportioning and arrangement of the tubular heater elements, and the manner in which they are connected to one another for the general purpose of obtaining good thermal efficiency and relatively large capacity for the amount of heating surface employed with relative rates of heat absorption in different portions of the heating apparatus whereby the oil as it passes through the apparatus, is subjected to certain predetermined thermal conditions tending to a certain desirable cracking effect, and minimizing injury to the oil or the apparatus as a result of local overheating.

The invention is characterized by special features of relative proportions of the heater element and of the disposition, and manner of connecting the tubular oil heater elements, all devised with the particular object of obtaining an efficient and effective oil heater in which the oil is subjected to temperature conditions adapted to produce a predetermined cracking effect and at the same time minimizing risk of local overheating injurious to the cracking process and the oil heater, and in particular the invention is devised for safely subjecting the oil to a prolonged period of heat absorption at a relatively low rate after the oil has been heated to a temperature approaching its maximum or final delivery temperature.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

Of the drawings:

Fig. 1 is a sectional elevation of an oil heater;

Figure 3:
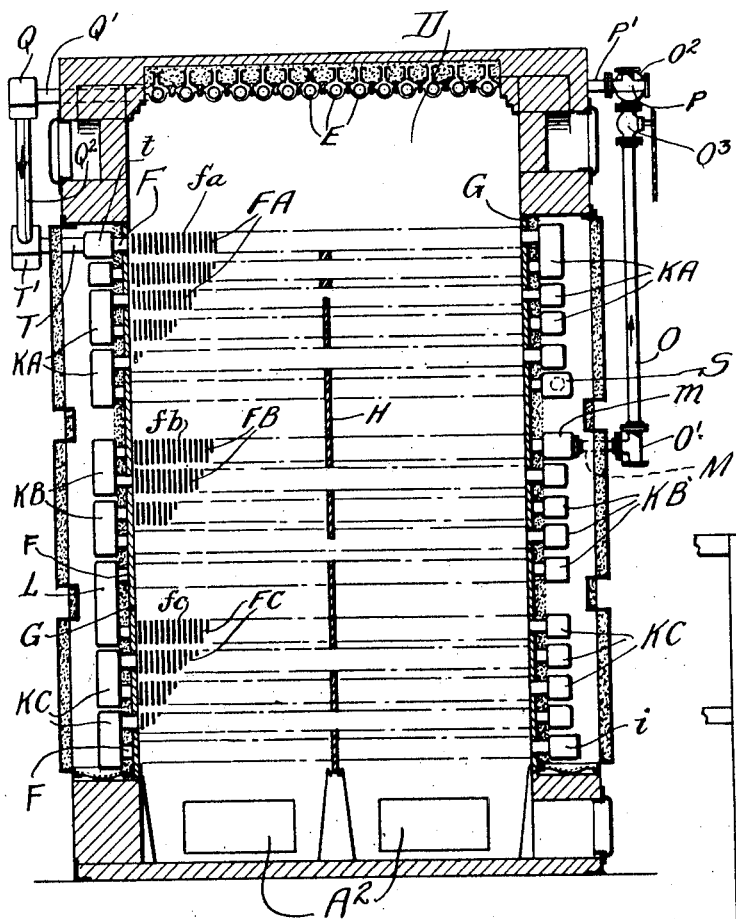
Figure 2A:
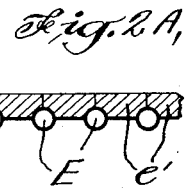
Fig. 2 is a section on the line 2—2 of Fig. 1.
Figure 2:
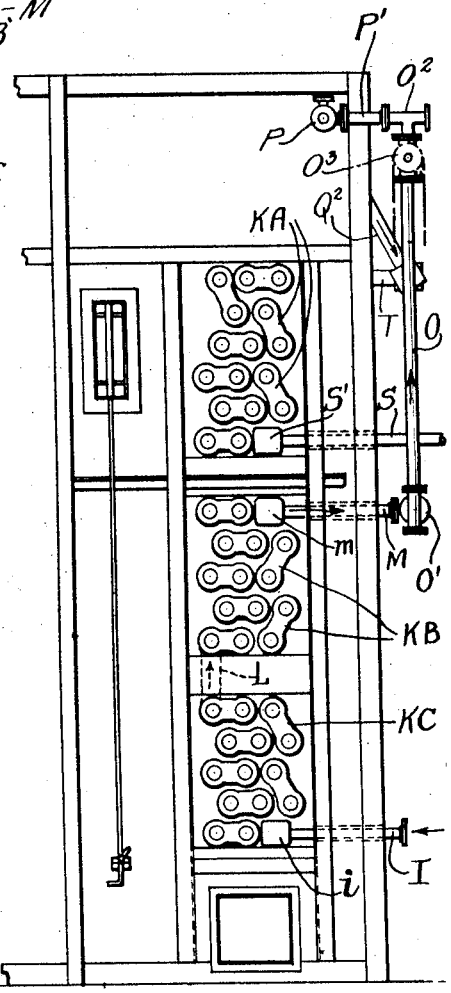
Figure 4:
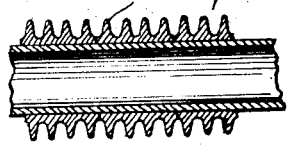
Figure 5:
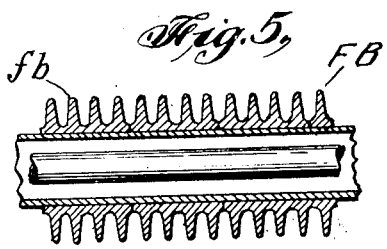

Fig. 2ᴬ is a partial section on the line 2ᴬ—2ᴬ of Fig. 1;

Fig. 3 is a front side elevation of a portion of the heater shown in Fig. 2;

Fig. 4 is a large scale sectional elevation of a portion of one of the tubular elements; and Fig. 5 is a view similar to Fig. 4 of another of one of the tubular elements.

The oil heating furnace A shown in the drawings, is divided internally by a bridge wall B into a combustion chamber C and a heating chamber D receiving the hot gases at its upper end from the combustion chamber over the top of the bridge wall. The tubular oil heating elements comprise a horizontal row of elements lining the underside of the roof of the combustion and heating chambers, and banks of tubular elements FA, FB, and FC located at successively lower levels and traversed by the heating gases passing downward through the chamber D to the furnace heating gas outlet A². Advantageously, and as shown, the elements FA, FB, and FC each consists of a tube F which extends through tube sheets or supporting plates G forming the end walls of the heating chamber D proper, and an externally corrugated cast iron casing formed of tubular externally corrugated sections which increase the heat absorbing surfaces of the element. The elements E which are heated, almost wholly by the absorption of radiant heat, are shown as each having its end portion above the heating chamber and an adjacent portion of the bridge wall, encased in cast metal blocks $e$ which increase the heat absorption by these portions of the elements. The remaining portions of the elements E might be similarly encased in metal to increase the heat absorption or might be encased in refractories to reduce the heat absorbed, but as shown are bare and are backed by tile $e'$ having tongue portions projecting down between the adjacent tubes to about the plane of the axes of the tubes to slightly diminish the heat absorption by the elements. Openings A' are provided in the front wall of the combustion chamber C for the insertion of oil or gas burners for heating the furnace. In so far as above described the furnace illustrated embodies no portion of the present invention, but on the contrary is but one form or type of existing oil heaters in, or by means of which the present invention may be utilized.

In accordance with the present invention, the various heater elements are connected so that the final portion of the path of flow for the oil through the various tubular elements E, FA, FB, and FC, is formed by the elements FA, through the superimposed rows of which the oil passes successively from the top to the bottom of the bank of those elements. The parallel, as distinguished from counter flow of the oil and heating gases through the portion of the heater in which the heating gases and the oil are each at high temperature, makes it possible to safely subject the oil at a high temperature to a sort of soaking action giving time for the cracking re-actions to occur.

The manner in which the various tubular elements are connected for flow of the oil in series therethrough will now be described. The oil enters the heater through a supply pipe I connected through a junction box $i$ to one end of one of the elements FC in the lowermost row of said elements. The various elements FC are connected in pairs at their opposite ends by return headers KC so that the oil entering the bank of elements through the junction box $i$ passes in series through the various elements FC in the lower row of such elements, then successively through the elements FC in the row above, and so on until the oil reaches the connector L through which it passes to one of the elements FB in the lower row of such elements. The elements FB are connected at their ends by return headers KB so that the oil passes successively first through the elements FB in the lowermost row then through the elements in the row above and so on until the oil reaches the junction box $m$. From the box $m$ the oil passes through piping shown as including a pipe section M, an elbow O', a vertical pipe O, throttling valve $O^3$, elbow $O^2$, elbow P, and pipe section P', to one end of one of the elements E. The latter are connected by means of return headers KE so that the oil passes successively through the various elements E to an outlet connection Q'. The outlet connection Q' is connected to one end of one of the elements FA in the top row of such elements by means comprising junction boxes Q, T', and $t$, and pipe connections $Q^2$ and T. The elements FA are connected by return headers KA so that the oil passes from the junction box $t$ successively through the elements FA forming the upper row of such elements, then through the elements FA in the row below and so on until the oil reaches the outlet box S' from which the heated oil delivery pipe S leads the oil and oil vapor mixture away from the heater.

To permit of a rate of heat absorption in the elements FA suitable for the safe completion of the heating and cracking operations therein, while at the same time obtaining the desired preliminary heating of the oil, and an absorption of the available heat from the heating gases adequate from the standpoint of thermal efficiency and capacity by the elements FB and FC, the heat absorbing surface area of the elements FA is advantageously made appreciably smaller per unit of element length than is the case with the elements FB and FC. To this end the casings $fa$ are made appreciably smaller in external diameter than are the casings $fb$. For example, in one practical construction embodying the present invention, the casings $fa$ are so shaped and proportioned as to provide 1½ square feet of heating surface per foot of elements length, while the casings $fb$ and $fc$ are, which in that particular construction though not necessarily are, of the same size, each provides about six square feet of heating surface per foot of length. The relative heat absorption by the elements FB and FC may be increased also, as shown, by mounting cores $F^{10}$ in those elements to increase the oil velocity therein in a known manner. Similarly the heating gas velocity over the elements FB and FC may be increased to increase the rate of heat absorption by means of gas deflectors $A^3$ placed on opposite walls of the heating chamber D, and by means of baffles $F^{11}$ supported by the elements FB and FC, the parts $A^3$ and $F^{11}$ serve to elongate the gas path in this portion of the heater.

The oil heater shown and described, was primarily devised for use in a process of cracking petroleum is maintained for an appreciable period at a temperature approaching the maximum attained in the process, and forms a highly effective and efficient apparatus for that purpose. In particular it provides a safe means for thus maintaining the oil at a high temperature for the period required or desirable for the completion of the cracking operation, with minimum risk of tube stoppage as a result of local overheating and consequently produced local carbon deposits on the inner walls of the tubes.

The location of the heater element FA in which the final stage of the oil heating operation is carried out at the top of the heating chamber D where they are swept by heating gases coming from the combustion chamber C at high temperature, insures an adequate temperature differential or heat head between the heating gases and oil notwithstanding the high temperature of the latter. The parallel flow of the heating gases and the oil, as distinguished from counter-flow, in this portion of the heater possesses the special advantage that as the oil flows downward through the bank of elements FA, the temperature differential between the gases and oil, and consequently the rate of heat absorption by the oil, diminishes progressively in the final stage of the oil heating operation.

While in accordance with the provisions of the statutes I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:

1. In the process of cracking oil in a tubular oil heater, the improvement which consists in heating the oil in three stages, in the first of which the oil containing tubes are subjected to a countercurrent heating effect by heating gases previously cooled in the two succeeding oil heating stages, and in the second of which the oil is heated by radiant heat absorbed from the combustion chamber of the furnace and the highly heated combustion gases, and in the third stage the oil containing tubes are subjected to a parallel current heating effect by heating gases partially cooled in the second oil heating stage.

2. A tubular oil cracking still comprising a combustion chamber, a heating chamber through which the heating gases are passed from the combustion chamber, two banks of tubes in said heating chamber extending transversely to the general direction of flow of the heating gases and successively traversed by the latter, tubular elements adapted to absorb radiant heat from the combustion chamber, and connections to and between said tubes and elements for passing the oil to be heated first through the tubes of the tube bank in the heat chamber last traversed by the heating gases, with a direction of oil flow therethrough generally counter to the direction of flow of the heating gases over the tubes, and then passing the oil through the radiant heat absorbing elements, and finally passing the oil through the tubes of the bank in the heating chamber first encountered by the heating gases, with a direction of oil flow through the last mentioned tubes generally parallel to the direction of flow of the heating gases over the tubes.

3. The apparatus of claim 2 characterized by the greater amount of heat absorbing surface area of each tube in the bank first traversed by the heating gases as compared with each tube in the other bank.

4. In an oil heater of the type comprising a combustion chamber, a heating chamber which is separated from the combustion chamber, a bridge wall over which the heating gases pass from the combustion chamber into the heating chamber which has a heating gas outlet at its lower end, and also comprising upper and lower groups of horizontally disposed tubes arranged in superimposed rows in said heating chamber, and conduit elements absorbing radiant heat from the combustion chamber and from the heating gases before the latter come into contact with said tubes, the improvement which consists in connections to said tubes and elements for first passing the oil successively through tubes of the lower group located at successively higher levels, and for then passing the oil through the radiant heat absorbing elements, and for finally passing the oil successively through tubes of the upper group located at successively lower levels.

5. The apparatus of claim 4 characterized by the greater amount of heat absorbing surface area per foot of length of each lower group tube as compared with each upper group tube.

6. In an oil heater of the type comprising a combustion chamber, a heating chamber which is separated from the combustion chamber, a bridge wall over which the heating gases pass from the combustion chamber into the heating chamber which has a heating gas outlet at its lower end, and also comprising upper and lower groups of horizontally disposed tubes arranged in superimposed rows in said heating chamber, and conduit elements absorbing radiant heat from the combustion chamber and from the heating gases before the latter come into contact with said tubes, the improvement which consists in connections to said tubes and elements for first passing the oil successively through tubes of the lower group located at successively higher levels, and for then passing the oil through the radiant heat absorbing elements, and for finally passing the oil successively through tubes of the upper group located at successively lower levels, and baffles for elongating the heating gas flow path over the tubes of the lower group to thereby increase the heat absorption of the last mentioned tubes without correspondingly increasing the heat absorption by the upper tubes.

Signed at New York city, in the county of New York, and State of New York, this 8th day of May, A. D. 1925.

JOHN PRIMROSE.